UNITED STATES PATENT OFFICE.

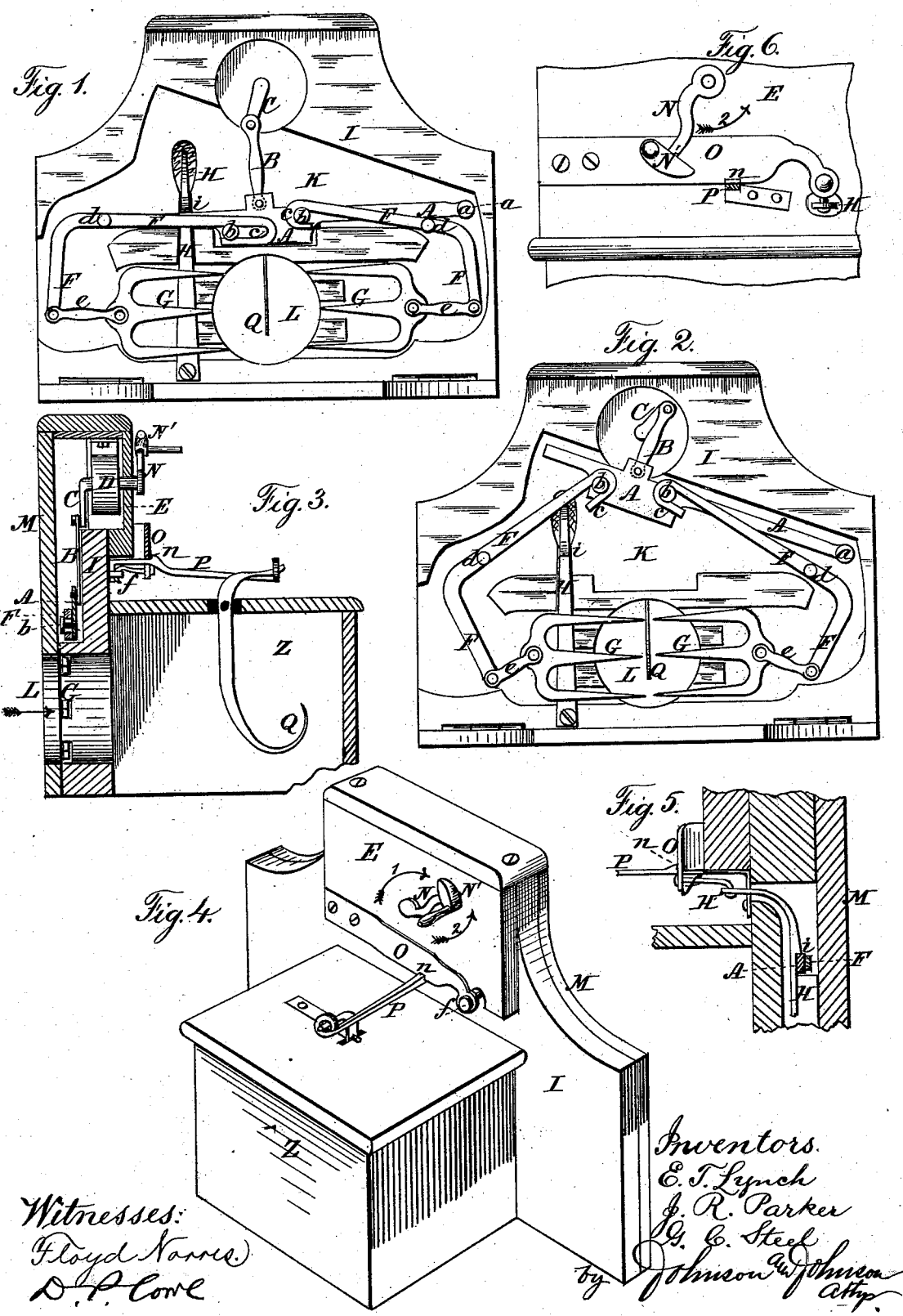

EMANUEL T. LYNCH, JOHN R. PARKER, AND GEORGE C. STEEL, OF CORNING, IOWA.

ANIMAL-TRAP.

SPECIFICATION forming part of Letters Patent No. 224,932, dated February 24, 1880.

Application filed September 29, 1879.

*To all whom it may concern:*

Be it known that we, EMANUEL T. LYNCH, JOHN R. PARKER, and GEORGE C. STEEL, of Corning, in the county of Adams and State of Iowa, have invented certain new and useful Improvements in Rat-Traps; and we do hereby declare that the following is a full, clear, and exact description of the invention, which will enable others skilled in the art to which it appertains to make and use the same, reference being had to the accompanying drawings, and to the letters of reference marked thereon, which form a part of this specification.

The invention relates to that class of traps wherein the animal is impaled; but it differs materially, in both object and construction, from the known traps of that class.

It has been common to impale both moles and rats to the death; but our object is to produce a trap that shall stab the rat mortally as it seizes the bait, but which shall withdraw the piercing-points at once, so that the rat, being released, retreats to die away from the trap, and also to so construct the stabbing mechanism that it shall reset itself for operation upon succeeding rats.

To this end we have invented the combination of a power connected by crank and lever with two pivoted arms carrying the spears or piercing-points and tripping devices adapted to operate, when the bait-hook is pulled, to throw the spears, and in which the power acts to retract them to their normal position, as hereinafter described.

In the accompanying drawings, Figure 1 represents a front elevation of our rat-trap, the board which covers the stabbing mechanism being removed and the trap shown as set; Fig. 2, a similar view with the spears in position as stabbing; Fig. 3, a vertical section, showing the relation of the entrance-opening to the bait-hook and stabbing-points; Fig. 4, a view, in perspective, looking from the rear, showing the spring O locked with the shoulder $n$ of the trip-rod P of the bait-hook; Fig. 5, a detail section, showing the shouldered spring H $i$ locked with the pivoted lever A; and Fig. 6, a detail, showing the crank cam-head N′ over the face of the spring O, to press it back to lock it with the trip-rod in setting the trap.

The lever A, which connects the stabbing devices with the power-spring and the tripping mechanism, is pivoted at one end, $a$, and connected by a pitman, B, and crank C with the power-spring D, which is held in a suitable box, E, which spring is wound up by the crank N, released and caught in actuating the stabbing-points by suitable devices, to be presently described.

Upon each side of the pitman-connection on the lever A are pins $b\ b$, engaging with hook ends or slotted connections $c\ c$ of arms F, to permit of the vibrating movements of said arms, which are pivoted at $d\ d$, and elbowed and attached to the spears G by links $e\ e$ or other suitable connection.

A spring-catch, H, holds, by a shoulder, $i$, the lever A at its free end, and thus holds the points set against the pull of the power-spring, and releases said lever to allow the coiled spring D to throw the spears and to again lock said lever A by the action of the crank C. This spring-catch H connects with and is controlled by spring-catch O, which engages with and is controlled by the shouldered trip-rod P $n$, connected with the bait-hook, so that the release of the spring-catch O releases the spring-catch H to free the driving-spring.

All these parts described are suitably fastened to the end board, I, in proper cut-out beds K, as shown, and it will be seen that the spears are thrown across the rat-entrance hole L, and that the parts are all covered by a face-covering board, M, hinged or otherwise fastened.

The power-spring D is wound up by a crank, N, and released to throw the spears and retract them by the following mechanism. It may be premised that when the spring is wound up it is capable of at least fifty actions of throwing and retracting the spears.

On the rear side of the box E is a plate spring-catch, O, connected by a link, $f$, with the spring-catch H, and this spring-catch O locks with the shoulder $n$ on the trip-rod P, to hold said spring-catch O in position to trip the spring-catch H $i$ when the bait is pulled, and allow the crank to operate the lever A to throw the stabbing-points by means of the pivoted levers F. The stabbing-points G are thus thrown and almost instantly retracted by the continued turning of the crank C, which causes the crank-head N' to pass over and in contact with the outer face of the spring-catch O, and, pressing it back, causes the shoulder n to again lock with it, as shown in Figs. 4 and 5, the shoulder i of the spring-catch H having in the meantime been locked with the main lever A, and in this way the stabbing-points are thrown and set at every revolution of the cranks C and N, the latter of which carries the head N', which acts like a cam to press the spring O back over the shoulder n of the trip-rod P, as shown in Fig. 6. By this arrangement the crank C throws the stabbing-points, as shown in Fig. 2, by suddenly pulling up the pivoted lever A, and immediately retracts the points by throwing down the said lever A over the shoulder i upon the spring-catch H, as shown in Figs. 1 and 5, while the crank N N', being controlled by the same power, sets the bait-hook through the tripping-rod P, so that the rat pulling at the bait pulls down the spring-rod P, releases the spring O, which, by its outward movement, pulls the spring-catch H with it, and tripping the shoulder i from the lever A, the power acts to operate the stabbing-points.

The power-spring is wound up by turning the crank N to the right, as indicated by the arrow 1 in Fig. 4, while the arrow 2 indicates the reverse turning of said crank, by the unwinding of the spring D, to throw and retract the stabbing-points, and by which the cam-head N' of said crank places the spring O over the trip-rod shoulder n to set the trap.

The bait-hook is pivoted in the top of a box, Z, which extends back of and covers the entrance-hole L, the connection of said hook with the trip-rod P being above the box, and the position of said hook in relation to the entrance-hole is such as to cause the rat to be stabbed behind the shoulders, which kills the rat, but not instantly, so that it will leave the trap free for another rat.

Instead of the spring-motor, we may use a weight and cord to operate the crank C, the throw of which must be sufficient to give a suitable movement to the points G and to carry the free end of the lever A over the shoulder i of the spring-catch H to set the trap.

The crank-cam N' causes the spring O to lock with the tripping-rod P at the same time the shouldered catch H i locks with the lever A, which actuates the stabbing-points.

We claim—

1. In a rat-trap, the combination, with a wound-up motor, of sliding spears or stabbing-points thrown across the rat-entrance from opposite sides, and at once retracted by means of intermediate pivoted arms connected with a controlling-lever operated by a crank-connection with said motor, substantially as herein set forth.

2. The combination, with a wound-up motor and sliding spears or stabbing-points G G, operated by crank-connection with said motor, of a pivoted lever, A, connected with and controlling said stabbing-points, and a spring-catch, H, locking by a shoulder, i, with said lever to hold the spears set, while said lever is released from its lock by means of the bait-hook connections O and P, substantially as herein set forth.

3. The combination, with a wound-up crank-motor, the stabbing-points connected and operated thereby, and the spring-catch H i, for holding the trap set, of the spring-catch O, the shouldered tripping-rod P n, and the bait-hook, whereby the stabbing-points are both held and released, substantially as herein set forth.

4. The combination, with the bait-hook tripping-rod P n and the spring-catch O, which connects with and releases the spring-catch H i of the stabbing-points, connected and operated by the cranked motor, substantially as herein set forth, of the crank-cam N' of said motor, whereby the bait-hook is again set, by the action of said crank-cam upon said spring O, during the retreating movement of the stabbing-points, and simultaneously with setting said points, substantially as herein set forth.

5. The combination, in a rat-trap, of a motor connected with and operating sliding stabbing-points with setting and tripping mechanism connecting said stabbing-points with the bait-hook, whereby to throw and retract said stabbing-points, substantially as herein set forth.

6. The combination, in a rat-trap, of the lever A, the slotted arms F c, the sliding spears, the motor-crank and link-connection C B, with said lever and the spring-catch H i, with suitable tripping and setting connections with the bait-hook, whereby the stabbing-points are thrown and retracted and again set through the continuous action of the motor, substantially as herein set forth.

In testimony that we claim the foregoing we have hereto affixed our signatures in the presence of two witnesses.

E. T. LYNCH.
J. R. PARKER.
G. C. STEEL.

Witnesses:
M. M. PARKER,
A. M. MOTTER.